(12) United States Patent
Tanaka et al.

(10) Patent No.: US 9,178,416 B2
(45) Date of Patent: Nov. 3, 2015

(54) ADJUSTING APPARATUS AND ADJUSTMENT METHOD

(71) Applicant: Cypress Semiconductor Corporation, San Jose, CA (US)

(72) Inventors: Masahiro Tanaka, Kani (JP); Hiroyuki Matsunami, Tajimi (JP); Osamu Yamaguchi, Sagamihara (JP); Osamu Sugaya, Urayasu (JP)

(73) Assignee: Cypress Semiconductor Corporation, San Jose, CA (US)

( * ) Notice: Subject to any disclaimer, the term of this patent is extended or adjusted under 35 U.S.C. 154(b) by 195 days.

(21) Appl. No.: 13/942,018

(22) Filed: Jul. 15, 2013

(65) Prior Publication Data
US 2014/0077783 A1 Mar. 20, 2014

(30) Foreign Application Priority Data
Sep. 19, 2012 (JP) .................................. 2012-206381

(51) Int. Cl.
G11C 5/14 (2006.01)
H02M 3/07 (2006.01)
H02M 3/156 (2006.01)

(52) U.S. Cl.
CPC ................ *H02M 3/07* (2013.01); *H02M 3/156* (2013.01)

(58) Field of Classification Search
CPC ........... H02M 3/07; H02M 3/156; G01C 5/14
See application file for complete search history.

(56) References Cited

U.S. PATENT DOCUMENTS

| 7,250,807 | B1 * | 7/2007 | Doyle | ........................... 327/534 |
| 8,988,143 | B2 * | 3/2015 | Berkhout | ...................... 327/543 |
| 2011/0101932 | A1 | 5/2011 | Nakazono | |

FOREIGN PATENT DOCUMENTS

| JP | 11-299224 A | 10/1999 |
| JP | 2011-91888 A | 5/2011 |
| JP | 2011-101479 A | 5/2011 |

\* cited by examiner

*Primary Examiner* — Hai L Nguyen

(57) ABSTRACT

An adjusting apparatus sets a designated value of a current source circuit to be a predetermined value, and causes discharging of a capacitor to end by switching a switch to a discharging side when the capacitor is not being charged by current output from a switching power source circuit. After the discharging of the capacitor ends and the designated value is set, the adjusting apparatus causes the capacitor to be charged by switching the switch to a charging side. The adjusting apparatus further measures a time period from the time when the switch is switched to the charging side until an electric potential difference of the capacitor exceeds a threshold value. Based on the measured time period and the predetermined value, the adjusting apparatus calculates the designated value such that the measured time period is a predetermined time period.

6 Claims, 18 Drawing Sheets

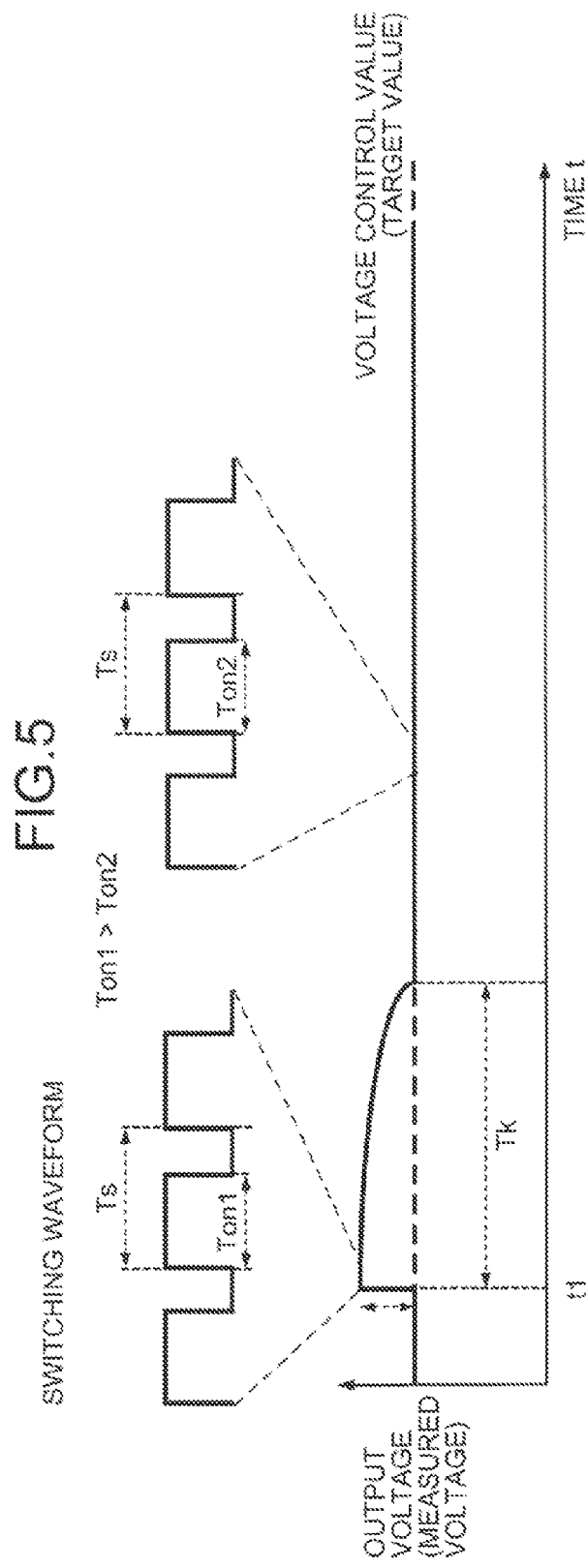

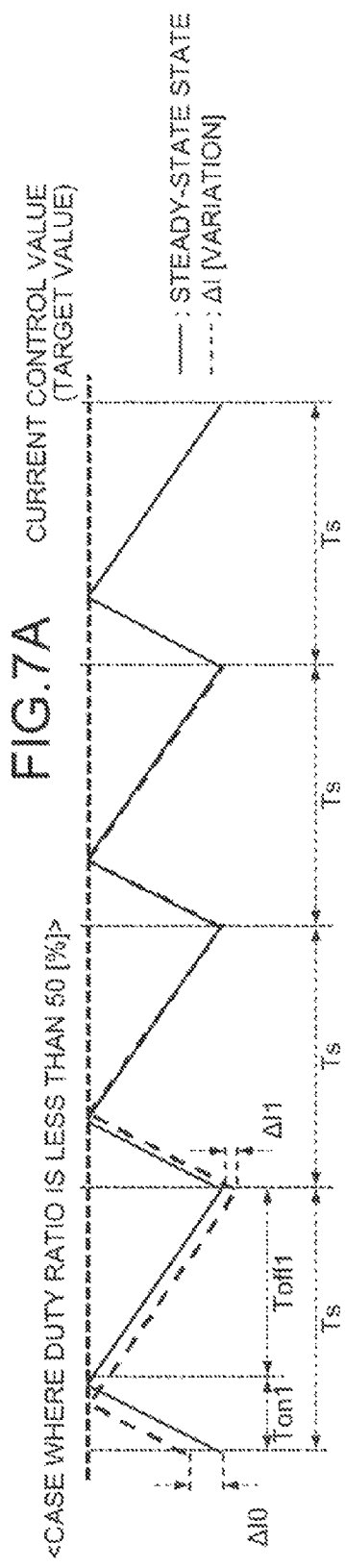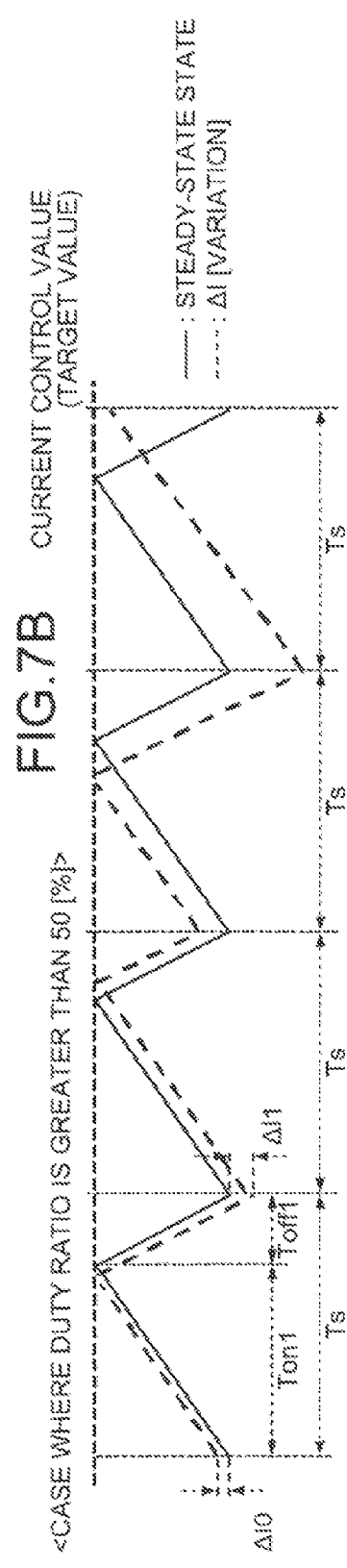

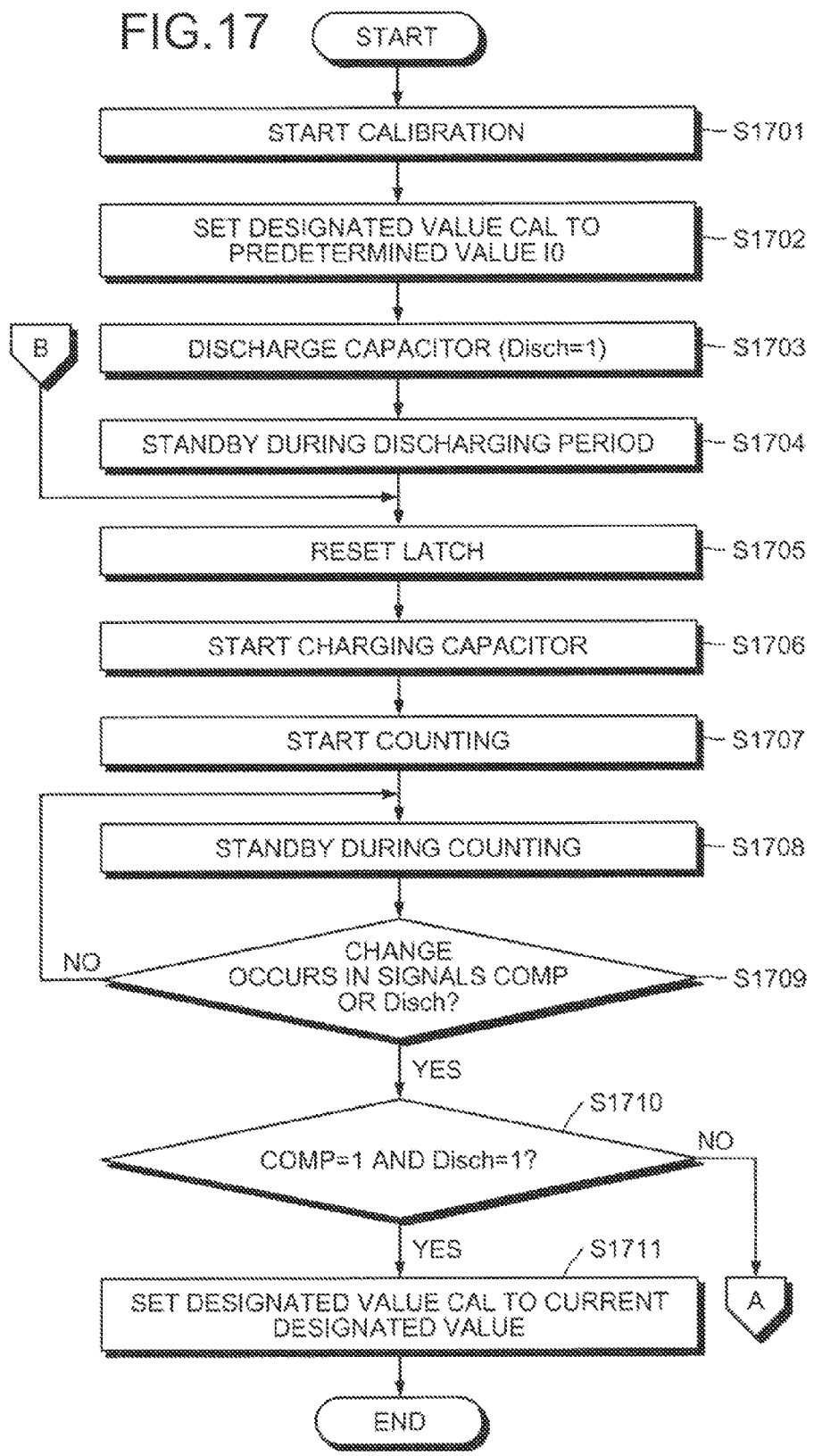

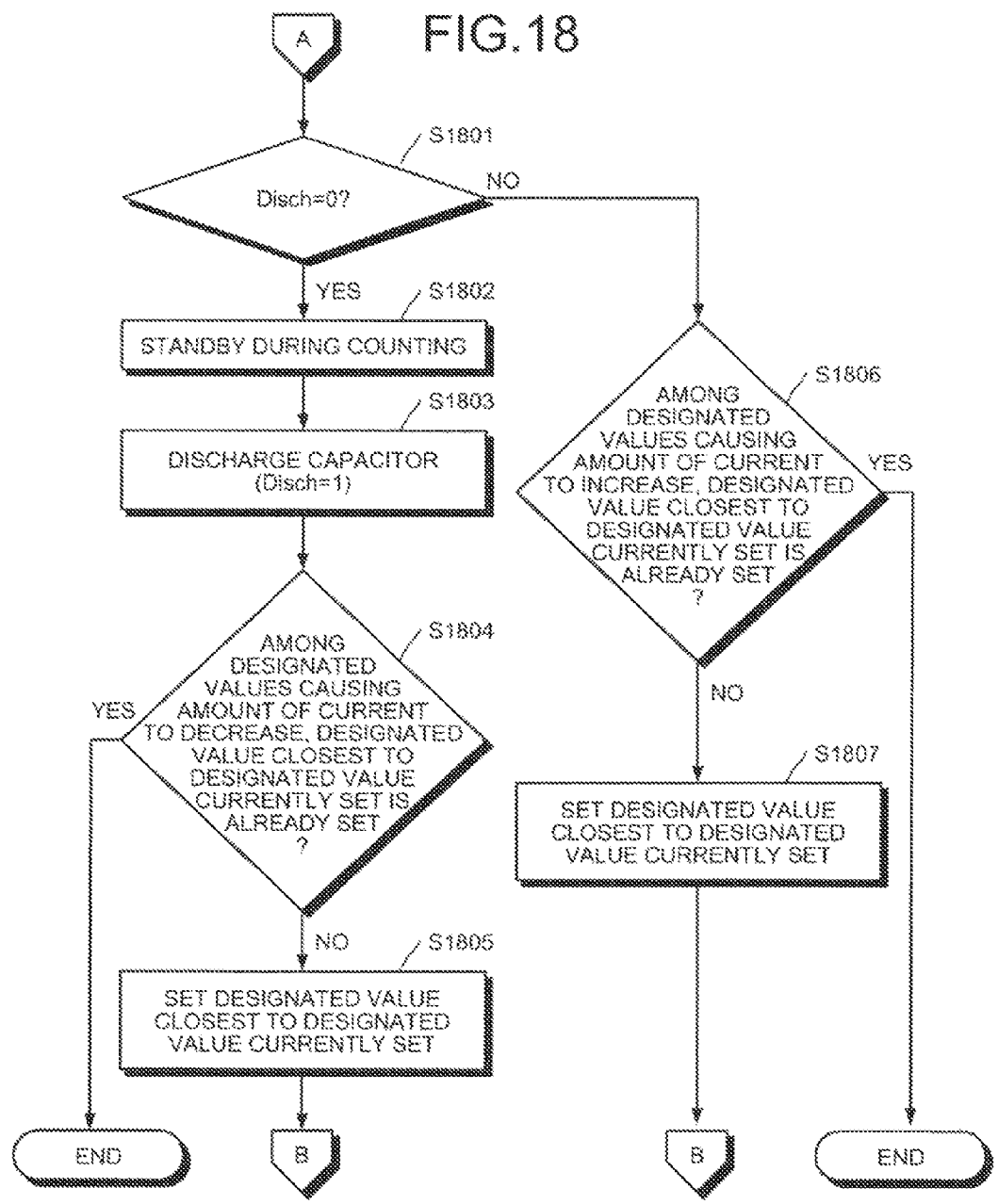

ADJUSTING APPARATUS AND ADJUSTMENT METHOD

CROSS REFERENCE TO RELATED APPLICATIONS

This application is based upon and claims the benefit of priority of the prior Japanese Patent Application No. 2012-206381, filed on Sep. 19, 2012, the entire contents of which are incorporated herein by reference.

FIELD

The embodiments discussed herein are related to an adjusting apparatus and an adjustment method.

BACKGROUND

According to a conventionally known technique, direct current voltage is output after being decreased or increased by a switching power source circuit (see, e.g., Japanese Laid-Open Patent Publication No. H11-299224). For example, the value of voltage output from the switching power source circuit is maintained at a constant value by increasing or decreasing the ratio of the ON time period to the OFF time period of a switching device of the switching power source circuit.

In this configuration, a sub-harmonic oscillation may occur when the ON time period of the switching device is controlled by feeding back the current from the switching power source circuit. According to another known technique, when the current controlling the switching power source circuit from the power source circuit is fed back, sub-harmonic oscillation is prevented by adding a predetermined current to the current that is fed back (see, e.g., Japanese Laid-Open Patent publication Nos. 2011-91888 and 2011-101479).

Nonetheless, the occurrence of errors increases by the amount of current added to the output current supplied from the switching power source circuit consequent to variations such as manufacturing conditions, and device temperature and the voltages during use.

SUMMARY

According to an aspect of an embodiment, an adjusting apparatus includes a capacitor that is charged by output current output from a switching power source circuit; a current source circuit that generates a current of an amount corresponding to a set designated value, and causes the capacitor to be charged by the generated current; a switch that switches between charging of the capacitor by the current from the current source circuit and discharging of the capacitor; a first setting unit that sets the designated value for the current source circuit to be a predetermined value; a first control unit that causes the discharging of the capacitor to end by switching the switch to a discharging side when the capacitor is not charged by the output current; a second control unit that causes the capacitor to be charged by switching the switch to a charging side, after the first control unit causes the discharging of the capacitor to end and the first setting unit sets the designated value; a measuring unit that measures a time period from a time when the second control unit switches the switch to the charging side until a time when an electric potential difference of the capacitor exceeds a threshold value; a calculating unit that calculates based on the time period measured by the measuring unit and the predetermined value, the designated value such that the time period measured by the measuring unit is a predetermined time period; and a second setting unit that sets the designated value for the current source circuit to be the designated value calculated by the calculating unit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is an explanatory diagram of an example of feedback control of voltage;

FIGS. 7A and 7B are explanatory diagrams of an example where current fluctuation occurs when the feedback control of the current is executed;

FIGS. 17 and 18 are flowcharts of an example of a procedure for the adjusting process executed by the adjusting apparatus according to the second embodiment.

DESCRIPTION OF EMBODIMENTS

Embodiments of an adjusting apparatus and an adjustment method will be described in detail with reference to the accompanying drawings. The adjusting apparatus is a circuit that controls the voltage of a square wave supplied to a switching power source circuit. The switching power source circuit converts direct current (DC) voltage into alternating current (AC) voltage and again converts the AC voltage into DC voltage (referred to as "DC-DC converter scheme") and thereby, decreases or increases the resulting DC voltage that is an input. A pulse width modulation (PWM) scheme is a scheme to determine the switching cycle of a DC-DC converter. The adjusting apparatus of the embodiments feeds back the output current supplied from the switching power source circuit when the square-wave voltage is supplied for the switching of the switching power source circuit. To stabilize the output current, the adjusting apparatus is equipped with a slope compensation function of adding current of a desired amount to the output current. As described, consequent to the variations in manufacturing, and in temperature and voltage, etc., error occurs in the amount of current added to the output current.

Two embodiments, a first embodiment and a second embodiment, will be described herein concerning the adjusting apparatus, which reduces the error in the amount of current added to the output current. In the first embodiment, a designated value to be set in a current source circuit is acquired by measuring a charging period that is the time consumed to charge a capacitor by the current added to the output current. In the second embodiment, a value that causes the time consumed for the added current to cause the electric potential difference of the capacitor to exceed a threshold value to be a predetermined time period is identified as the designated value.

Figure 1:
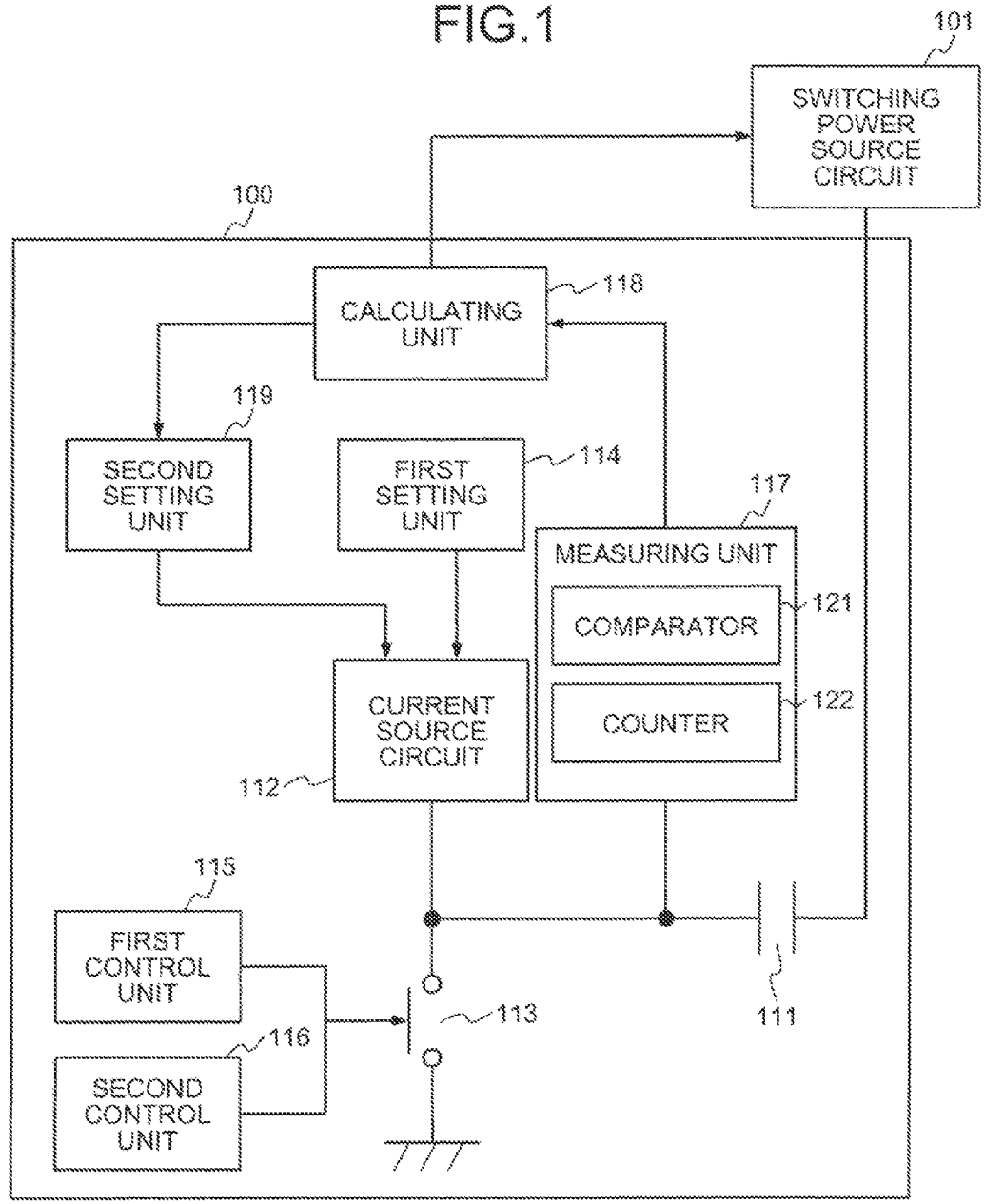
FIG. 1 is an explanatory diagram of an example of an adjusting apparatus according to a first embodiment.

FIG. 1 is an explanatory diagram of an example of the adjusting apparatus according to the first embodiment. An adjusting apparatus 100 makes adjustments such that the amount of current added to the current output from a switching power source circuit 101 is constant. Description of the square wave voltage that is for switching and supplied to the switching power source circuit 101, etc., will be made later with reference to the accompanying drawings. The adjusting apparatus 100 includes a capacitor 111, a current source circuit 112, a switch 113, a first setting unit. 114, a first control unit 115, a second control unit 116, a measuring unit 117, a calculating unit 118, and a second setting unit 119.

Current output from the switching power source circuit 101 flows in the capacitor 111. The current source circuit 112 generates current of an amount that corresponds to the set designated value and causes the capacitor 111 to be charged by the generated current. The switch 113 switches between charging the capacitor 111 using the current from the current source circuit 112 and discharging the capacitor 111.

The first setting unit 114 sets the designated value of the current source circuit 112 to a predetermined value. It is assumed that the predetermined value is determined by a user or a designer of the adjusting apparatus 100 and is stored in advance in a storage device such as a register of the adjusting apparatus 100. The first control unit 115 ends the discharging of the capacitor 111 by switching the switch 113 to the discharging side when the output current does not flow to the capacitor 111. The second control unit 116 causes the capacitor 111 to be charged, by switching the switch 113 to the charging side after the first control unit 115 causes the discharging of the capacitor 111 to end and the first setting unit 114 has set the designated value.

The measuring unit 117 measures a time period from the time when the second control unit 116 switches the switch 113 to the charging side, until the time when the electric potential difference of the capacitor 111 exceeds the threshold value. The "electric potential difference of the capacitor 111" is an electric potential difference generated across the capacitor 111. The measuring unit 117 includes a comparator 121 and a counter 122. The comparator 121 determines whether the electric potential difference exceeds the threshold value. The counter 122 counts the time period from the time when the second control unit 116 switches the switch 113 to the charging side until the time when the electric potential difference across the capacitor 111 exceeds the threshold value, based on the result of the determination by the comparator 121. Although the counter 122 is distinguished from a counter 331, the two counters may be one counter and, for example, the counter 331 may have the function of the counter 122.

The calculating unit 118 calculates based on the time period measured by the measuring unit. 117 and a predetermined value, the designated value such that the time period measured by the measuring unit. 117 becomes the predetermined time period. It is assumed that the predetermined time period is determined according to the amount of current that is desired to be added to the output current and is stored in advance in the storage device such the register of the adjusting apparatus 100. The amount of current desired to be added is determined based on the cycle of the square wave voltage, the ON time period thereof, etc. The second setting unit 119 sets the designated value of the current source circuit. 112 to be the designated value that is calculated by the calculating unit 118.

Thus, even with variations in manufacturing, the amount of current added based on the slope compensation can be maintained to be constant and the operation of the switching power source circuit 101 can be stabilized.

Before describing a detailed example of the adjusting apparatus 100, the switching power source circuit 101 and the oscillation of the square wave for the switching supplied to the switching power source circuit 101 will briefly be described.

Figure 2:
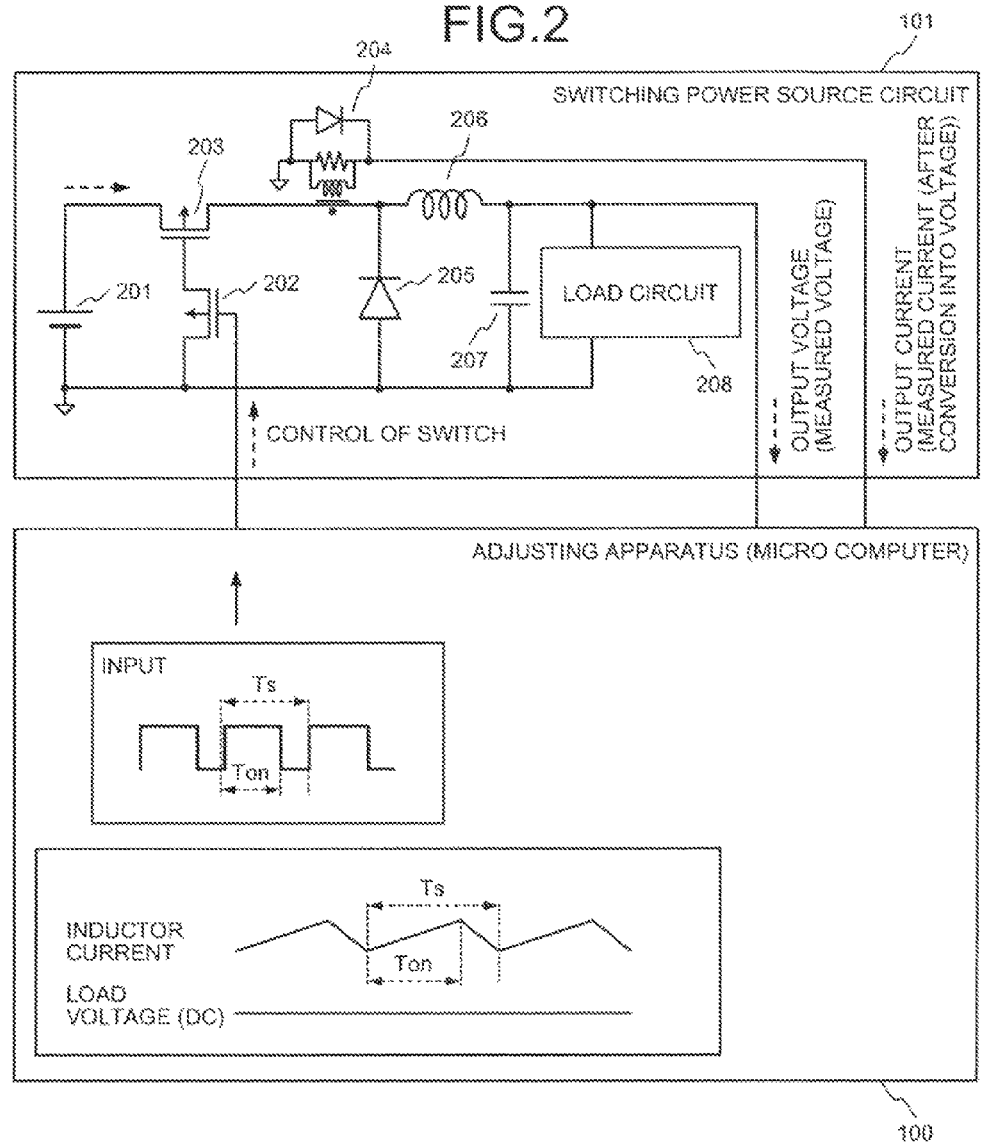
FIG. 2 is an explanatory diagram of an example of a switching power source circuit.

FIG. 2 is an explanatory diagram of an example of the switching power source circuit. The switching power source circuit 101 depicted in FIG. 2 is a simplified example of a voltage-decreasing type. The switching power source circuit 101 decreases the DC voltage supplied from a voltage source 201 such as a battery, etc., and supplies the resulting voltage to a load circuit 208. The load circuit 208 can be, for example, a DC motor. For example, the switching power source circuit 101 includes a metal-oxide-semiconductor (MOS) 202 for the switching, a power switch 203, a current transformer 204, a free wheel diode 205, an inductor (coil) 206, and a capacitor 207.

For example, the MOS 202 switches between ON and OFF based on the square wave voltage from the adjusting apparatus 100 (a micro computer). In the switching power source circuit 101, the current transformer 204 senses the current flowing in the power switch 203 and converts the current into voltage; and the inductor 206 and the capacitor 207 rectify the voltage from the current transformer 204 to be DC voltage. The current after the voltage conversion by the current transformer 204 is the output current (measured current) and the DC voltage is the output voltage (measured voltage).

In the switching power source circuit 101, an ideal value of the DC voltage rectified by the inductor 206 and the capacitor 207 is "α×an input voltage from the voltage source 201". "α" is a duty ratio and is "Ton/Ts". "Ts" represents the cycle of the square wave voltage input into the switching power source circuit 101. "Ton" represents the ON time period in each cycle of the square wave voltage. In the example of the adjusting apparatus 100 depicted in FIG. 2, the rectified DC voltage is referred to as "load voltage (DC)" and the current flowing in the inductor 206 is referred to as "inductor current".

In the first embodiment, output voltage or the output current from the switching power source circuit 101 is sensed and thereby, feedback control is executed.

Figure 3:
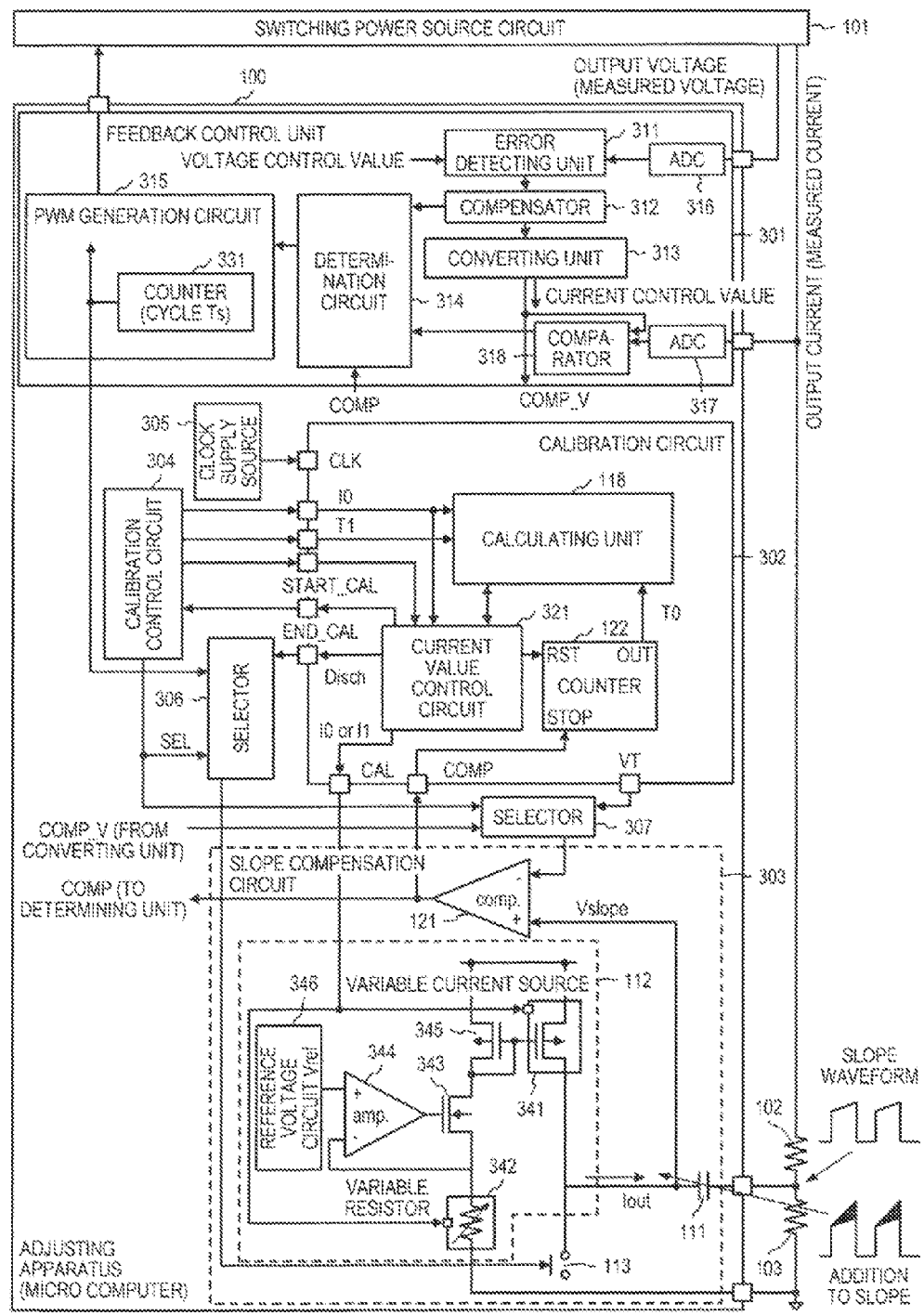
FIG. 3 is an explanatory diagram of a detailed example of the adjusting apparatus according to the first embodiment.

FIG. 3 is an explanatory diagram of a detailed example of the adjusting apparatus according to the first embodiment. The adjusting apparatus 100 includes a feedback control unit 301, a calibration circuit 302, a slope compensation circuit 303, a calibration control circuit 304, a clock supply source 305, and selectors 306 and 307. The adjusting apparatus 100 is, for example, a micro computer. The circuits and the components of the adjusting apparatus are formed by elements such as, for example, an inverter that is a logic inverter circuit, an AND circuit that is a logical multiplication circuit, an OR circuit that is a logical addition circuit, a latch, a flip flop (FF), a capacitor, a resistive element, and a transistor.

The feedback control unit 301 includes an error detecting unit 311, a compensator 312, a converting unit 313, a determination circuit 314, a PWM generation circuit 315, an analog digital converter (ADC) 316 that receives the output voltage, an ADC 317 that receives the output current, and a comparator 318.

The PWM generation circuit 315 generates the square wave voltage using information concerning "Ton" input from the determination circuit 314 and "Ts" counted by the counter 331, and outputs the square wave voltage to the switching power source circuit 101.

Figure 4A:
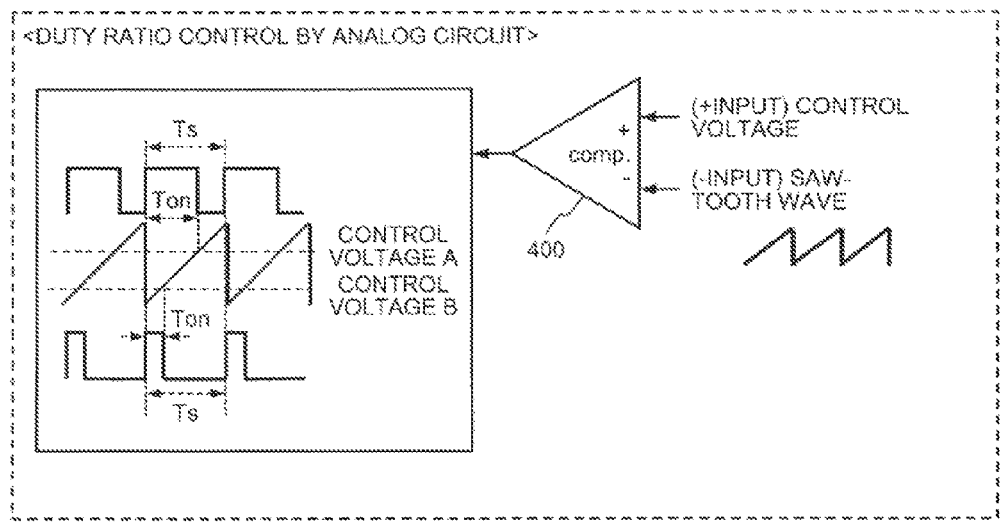
FIGS. 4A and 4B are explanatory diagrams of an example of control of a duty ratio executed by a PWM generation circuit.
Figure 4B:
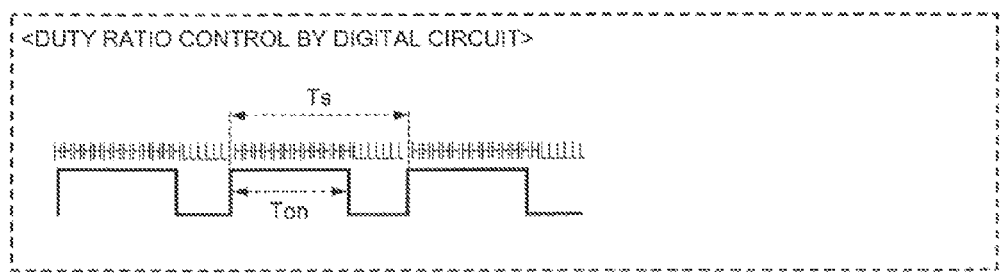

FIGS. 4A and 4B are explanatory diagrams of an example of control of the duty ratio executed by the PWM generation circuit. The PWM generation circuit. 315 formed by an analog circuit outputs the square wave voltage by executing, via a comparator 400, a comparison of a control voltage input as the information concerning Ton and a saw-tooth wave voltage whose one cycle is Ts. For example, in FIGS. 4A and 4B, control voltage A is higher than control voltage B and therefore, when the control voltage A is input, the square wave voltage whose Ton is longer than that when the control voltage B is input, is output from the comparator 400. In a case described later where the current is fed back, the square wave voltage is generated by the comparator 318.

The PWM generation circuit 315 formed by a digital circuit receives input of a digital value that represents Ton and is from the determination circuit 314. The PWM generation circuit 315 outputs a high-level voltage (hereinafter, referred to as "H") for Ton during Ts that is counted by the counter 331 and outputs a low-level voltage (hereinafter, referred to as "L") during the rest of the time period. Thereby, the PWM generation circuit 315 generates the square wave voltage and outputs the square wave voltage to the switching power source circuit 101.

In the first embodiment, the feedback control unit 301 concurrently employs feedback control of the voltage, feedback control of the current, and feedback control of the current for which the slope compensation is executed. The feedback control of the voltage is executed by the ADC 316, the error detecting unit 311, and the compensator 312. For an analog circuit, the ADC 316 is unnecessary. The feedback control of the current is executed by the ADC 317, the converting unit 313, and the comparator 318. For the analog circuit, the ADC 317 is unnecessary. The feedback control of the current for which the slope compensation is executed is executed by the slope compensation circuit 303.

The feedback control of the current provides better responsiveness than the feedback control of the voltage. For example, when the voltage supplied to the load circuit 208 is increased excessively, the feedback control of the current reduces the increased voltage faster than the feedback control of the voltage does. On the other hand, the feedback control of the voltage provides better convergence than the feedback control of the current. Therefore, the feedback control of the voltage and that of the current may be employed in combination.

The determination circuit 314 selects any one among three inputs from the compensator 312, the comparator 318, and the slope compensation circuit 303 and inputs the selected input into the PWM generation circuit 315. The user of the micro computer that is the adjusting apparatus 100 determines whether feedback control is be switched and at what timing.

The feedback control of the voltage will be described. The error detecting unit 311 detects error between a voltage control value and the output voltage. The "voltage control value" is a target value of the output voltage. For example, the error detecting unit 311 is an amplifier. The compensator 312 has a function of cancelling the convergence to and the steady-state error of the voltage control value. "To cancel the steady-state error" means to match the voltage control value and the output voltage with each other. The "convergence" means presence of no oscillation even with feedback.

FIG. 5 is an explanatory diagram of an example of the feedback control of the voltage. Output from the compensator 312 when the PWM generation circuit 315 controls the duty ratio using an analog circuit will be described. The compensator 312 adjusts the control voltage supplied to the comparator 400 based on the error between the voltage control value detected by the error detecting unit 311 and the output voltage, and outputs the control voltage to the determination circuit 314. For example, when the error detecting unit 311 detects that the output voltage is increased to a value that exceeds the voltage control value, the compensator 312 decreases the control voltage to a value lower than the predetermined value. The predetermined value is a value that is determined in advance during design. Thus, Ton of the square wave voltage ("Ton 1" in FIG. 5) becomes shorter and the duty ratio becomes smaller than when the output voltage matches the voltage control value. Consequently, the output voltage is decreased. For example, when the error detecting unit 311 detects that the output voltage is decreased to a value that is lower than the voltage control value, the compensator 312 increases the control voltage to a value exceeding the predetermined value. Thereby, Ton of the square wave voltage ("Ton 2" of FIG. 5) becomes longer and the duty ratio becomes larger than when the output voltage matches the voltage control value. Consequently, the output voltage is increased.

A time period Tk that elapses until a steady-state state is reached where no steady-state error occurs depends on the design of the compensator 312. For example, the compensator 312 of the analog circuit includes an integration circuit, a differentiation circuit, and a circuit formed by combining an integration circuit and a differentiation circuit. The time period Tk depends on parameters of both the integration circuit and the differentiation circuit. For example, the compensator 312 of a digital circuit calculates "$C(s)=K_p+K_i(1/s)+K_d \times S$", and the proportionality coefficient Kp, the integration coefficient. Ki, and the differentiation coefficient Kd are set in advance by the designer. The time period Tk depends on the proportionality coefficient Kp, the integration coefficient Ki, and the differentiation coefficient Kd.

The feedback control of the current and the feedback control of the current using the slope compensation will be described.

The comparator 318 compares the current control value and the output current in terms of magnitude, and outputs the result of the comparison to the determination circuit 314. The current control value is the target value of the output current, is output from the converting unit 313, and is a value of a signal COMP_V, When the determination circuit 314 selects the feedback control of the current, the result of the comparison is directly supplied to the switching MOS 202 of the switching power source circuit 101. When the value of the output current becomes the current control value, the power switch 203 in the switching power source circuit 101 is turned off and the current from the voltage source 201 is blocked. The inductor 206 and the free wheel diode 205 are disposed upstream to the load circuit 208 and therefore, current flows in the load circuit 208. In the next cycle, the power switch 203 is again turned on and a current is supplied thereto from the voltage source 201.

Figure 6:
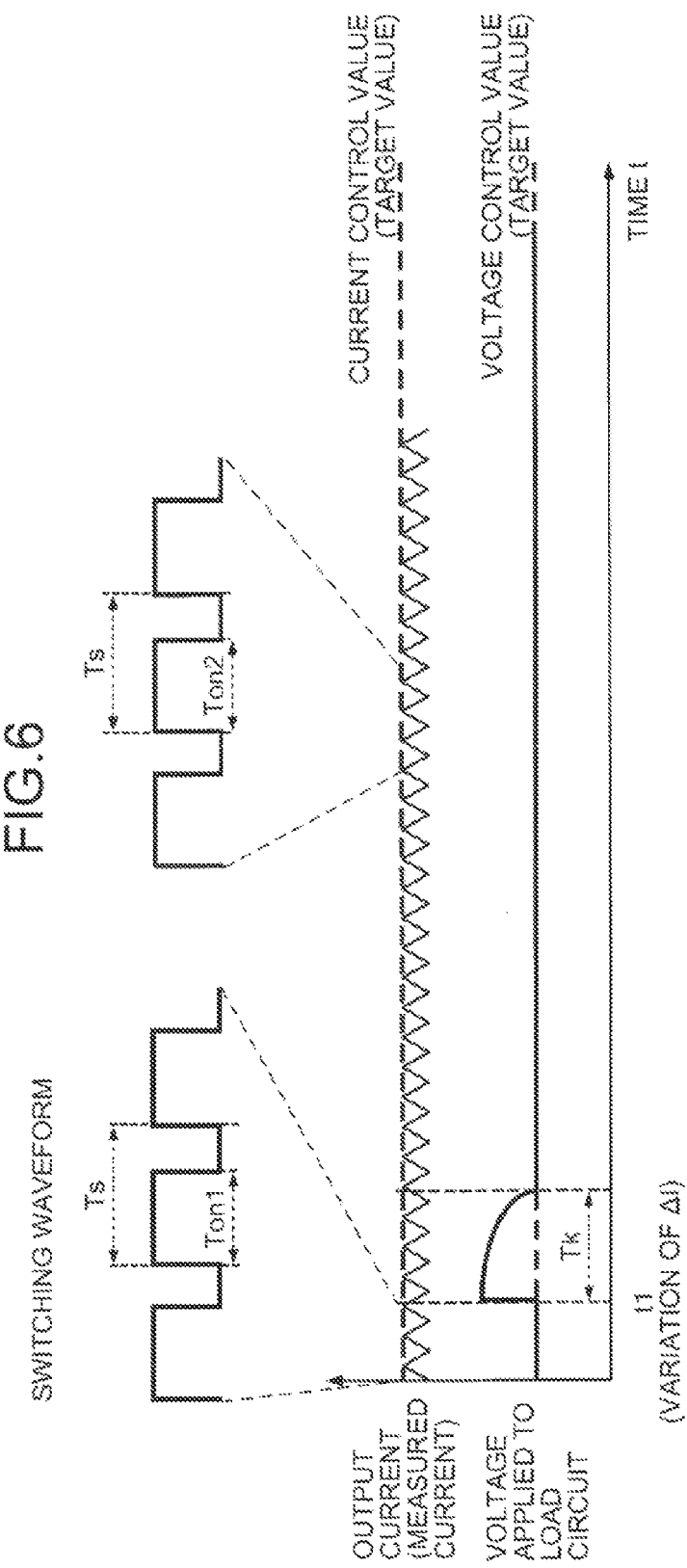
FIG. 6 is an explanatory diagram of an example of the feedback control of current.

FIG. 6 is an explanatory diagram of an example of the feedback control of the current. For example, when the value of the output current is higher than the current control value, the comparator 318 outputs a high-level voltage. Thereby, the power switch 203 is turned off. For example, when the value of the output current is lower than the current control value, the comparator 318 outputs "L". The current immediately before the inductor (a coil) 206 is input into the comparator 318 and consequently, the steady-state state of the current to be measured presents a saw-tooth wave as depicted in FIG. 6. As depicted in FIG. 6, when the output current is increased by ΔI at a time t1, the time period is shortened for the value of the output current to reach the current control value. Therefore, the ON time period (Ton) is shortened of the power switch 203 of the switching power source circuit 101 and the OFF time period (Toff) thereof is increased. Consequently, on average, the output current is decreased and the voltage applied to the load circuit 208 (the load voltage) is increased.

FIGS. 7A and 7B are explanatory diagrams of an example where current fluctuation occurs when the feedback control of the current is executed. FIGS. 7A and 7B depict an example where a current fluctuation ΔIs (s=1, 2, 3, . . . . ) occurs in the output current. As depicted in FIG. 7A, when the duty ratio is smaller than 50 [%], ΔI0 is ΔI0>ΔI1 in each cycle Ts and therefore, ΔI is gradually decreased.

As depicted in FIG. 7B, when the duty ratio is larger than 50 [%], ΔI0 is ΔI0<ΔI1 in each cycle Ts and therefore, ΔI is gradually increased and does not converge. Consequently, the output current may become unstable and may cause sub-harmonic oscillation.

According to the feedback control of the current, a slope current is added to the output current and thus, even when the duty ratio is larger than 50 [%], convergence is caused as in the case where the duty ratio is smaller than 50 [%].

Figure 8:
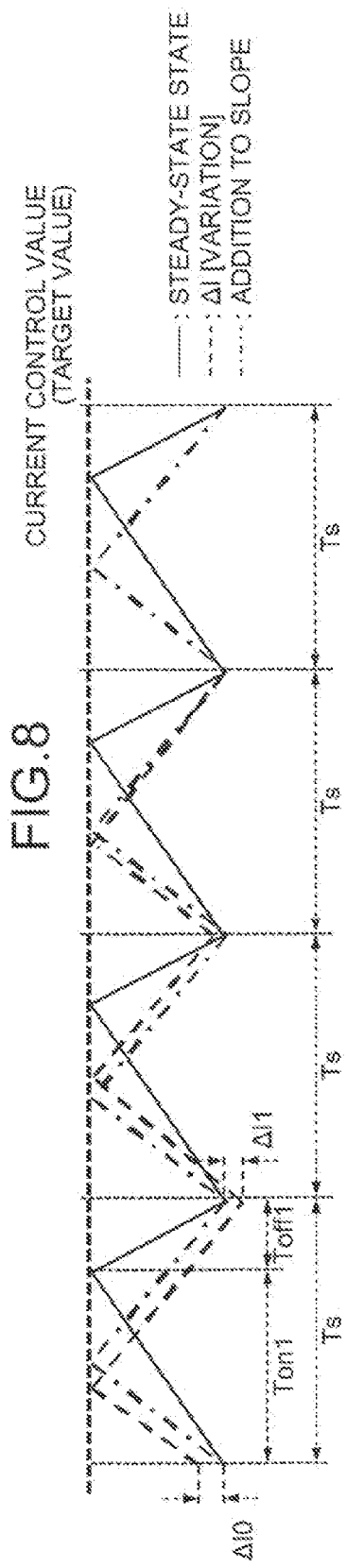
FIG. 8 is an explanatory diagram of an example of slope compensation.

FIG. 8 is an explanatory diagram of an example of the slope compensation. The slope current is added to the output current and thereby, the time period for the value of the output current to reach the current control value is shorter than ½×Ts and consequently, operation becomes identical to a case where the duty ratio is smaller than 50 [%].

When variations in manufacturing or in the voltage or the temperature, etc. occur, error is caused in the amount of current added to the output current. For example, an error is caused in the reference voltage and the reference resistance of the current source circuit 112 and in the offset of both the capacitor 111 and the comparator 121 by variations in manufacturing, the voltage or the temperature and thus, error is caused in the amount of current added to the output current. In the case where the duty ratio is larger than 50 [%], when error is caused in the amount of current added to the output current, the square wave voltage may oscillate as depicted in FIG. 7. In the first embodiment, the amount of current added to the output current is adjusted by the calibration circuit 302, which adjusts the amount of current added to the output current such that the amount is constant even with variations in the manufacturing, the voltage, the temperature, etc. Thus, the error added to the output current can be reduced. Consequently, a desired square wave voltage can be supplied to the switching power source circuit 101 and the operation of the switching power source circuit can be stabilized.

The calibration circuit 302 has a function of adjusting the amount of current added by the slope compensation circuit 303 to the output current. The calibration circuit. 302 includes a current value control circuit 321, the counter 122, and the calculating unit 118, and receives a clock signal for the counter 122 to count from the clock supply source 305.

The current value control circuit 321 includes the first setting unit 114, the first control unit 115, the second control unit 116, and the second setting unit 119 that are depicted in FIG. 1. The slope compensation circuit 303 includes the comparator 121, the capacitor 111, the switch 113, and the current source circuit 112. The counter 122 and the comparator 121 implement the measuring unit 117 depicted in FIG. 1.

The current output from the switching power source circuit 101 flows in the capacitor ill. For example, the voltage of the current output from the switching power source circuit 101 is divided by resistors 102 and 103 and the output current flows to the capacitor 111. The current source circuit 112 generates current of an amount that corresponds to a set designated value CAL, and causes the capacitor 111 to be charged by the generated current. The current source circuit 112 includes, for example, a variable current source 341, a variable resistor 342, MOSs 343 and 345, an amplifier 344, and a reference voltage circuit 346 that generates the reference voltage Vref. In the current source circuit 112, the variable current source 341 and the variable resistor 342 adjust the amount of the current generated by the current source circuit 112. The variable current source 341 and/or the variable resistor 342 may be variable.

Figure 9:
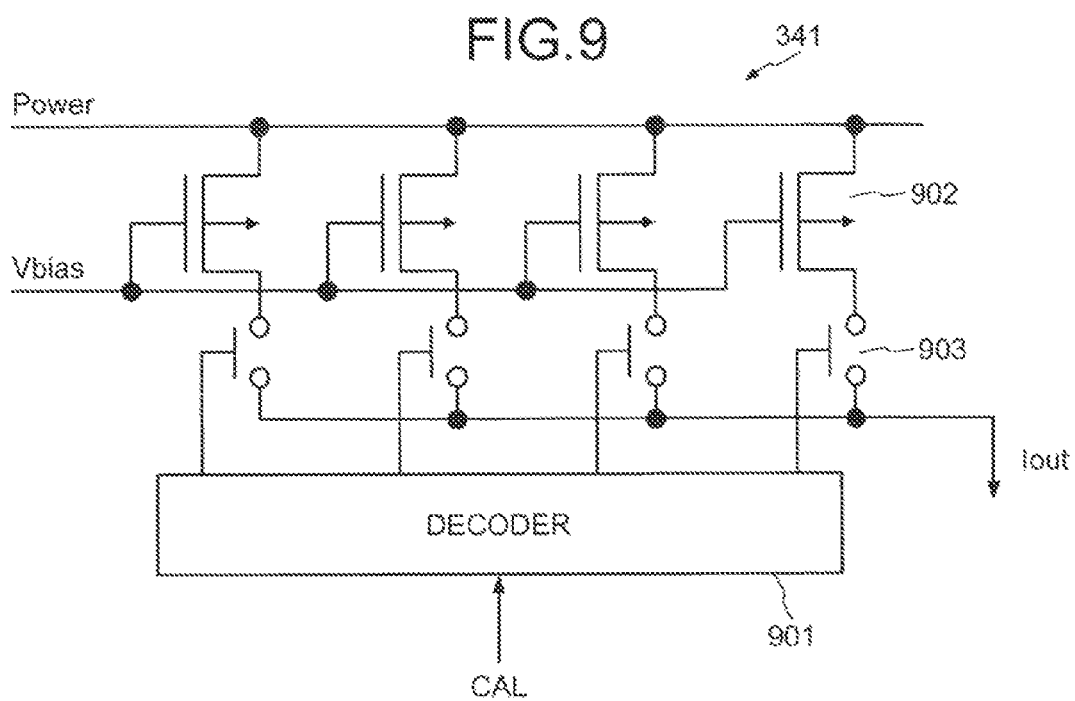
FIG. 9 is an explanatory diagram of an example of a variable current source.

FIG. 9 is an explanatory diagram of an example of the variable current source. The variable current source 341 includes, for example, a decoder 901, plural MOSs 902, and switches 903 that correspond one-to-one to the plural MOSs 902. The variable current source 341 decodes the designated value CAL using the decoder 901; switches each of the switches 903 each between ON and OFF; and thereby, adjusts the amount of current.

Figure 10:
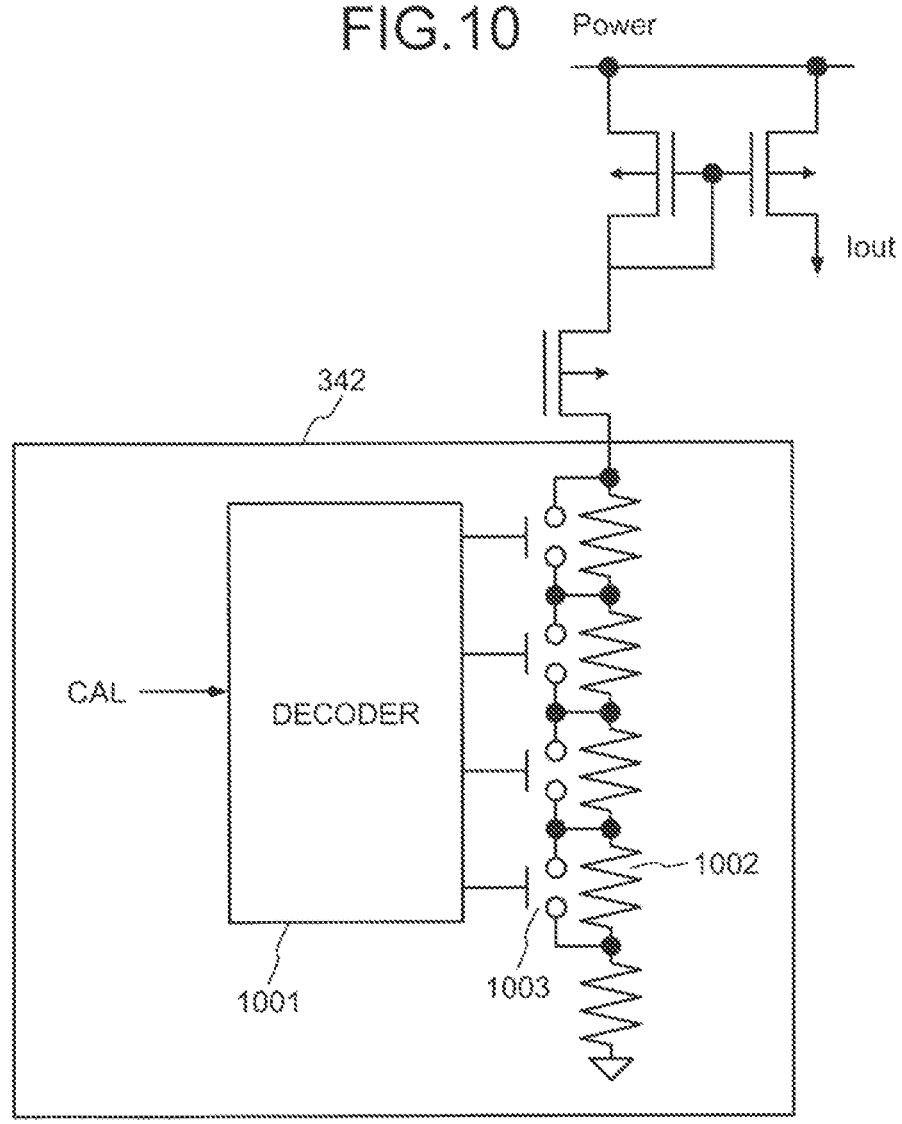
FIG. 10 is an explanatory diagram of an example of a variable resistor.

FIG. 10 is an explanatory diagram of an example of the variable resistor. The variable resistor 342 includes, for example, a decoder 1001, plural resistors 1002, and switches 1003 that correspond one-to-one to the plural resistors 1002. The variable resistor 342 decodes the designated value CAL using the decoder 1001; switches each of the switches 1003 between ON and OFF; and thereby, adjusts the amount of current.

The switch 113 switches between the charging of the capacitor 111 by the current from the current source circuit 112 and the discharging of the capacitor 111. When the calibration circuit. 302 executes no adjustment for the slope current, the switch 113 is switched between the charging and the discharging according to Ts. When the calibration circuit 302 executes the adjustment for the slope current, the switch 113 is switched between the charging and the discharging according to a signal Disch from the current value control circuit 321. For example, the selector 306 selects any one among a signal for the cycle Ts and the signal Disch based on a signal SEL from the calibration control circuit 304 and outputs the selected signal to the switch 113. For example, when the signal SEL is "L", the selector 306 selects the signal for the cycle Ts, and when the signal SEL is "H", the selector 306 selects the signal Disch.

Similar to the comparator 318, in a case where the calibration circuit 302 executes no adjustment for the slope current, when the value of the output current is higher than the current control value, the comparator 121 outputs "H". Thereby, the power switch 203 is turned off. For example, when the value of the output current is lower than the current control value, the comparator 121 outputs "L".

When the calibration circuit 302 executes no adjustment for the slope current, the selector 307 inputs into the comparator 121, the signal COM_V that indicates the current control value. When the calibration circuit 302 executes the adjustment for the slope current, the selector 307 inputs into the comparator 121, a signal VT that is the threshold value. The signal VT has a constant voltage. For example, the selector 307 selects any one among the signals COM_V and VT based on the signal SEL from the calibration control circuit 304, and outputs the selected signal to the comparator 121. For example, when the signal SEL is "L", the selector 307 selects the signal COMP_V, and when the signal SEL is "H", the selector 307 selects the signal VT.

Figure 11:
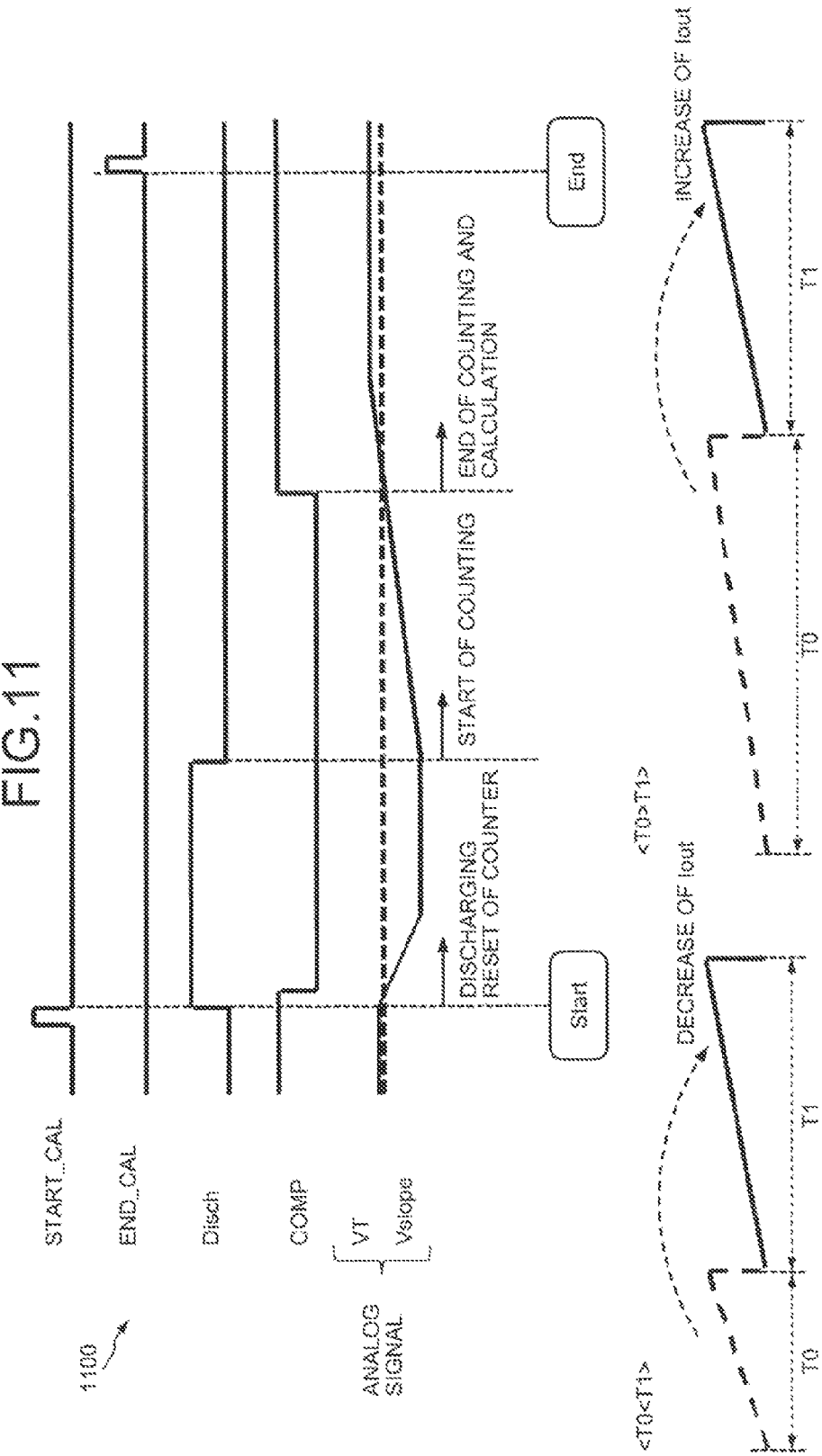
FIG. 11 is an explanatory diagram of an example of adjustment.

FIG. 11 is an explanatory diagram of an example of adjustment. As depicted in a timing chart 1100, for example, when the calibration control circuit 304 starts the calibration, the calibration control circuit 304 outputs a pulse onto the signal START_CAL. The "pulse" means to output "H" for a predetermined time period. The PWM generation circuit 315 discontinues the outputting of the square wave voltage to the switching power source circuit 101 triggered by the fall-down timing of the pulse of a signal START_CAL.

The current value control circuit 321 in the calibration circuit 302 causes the signal Disch to be "H" triggered by the fall-down timing of the pulse of the signal START_CAL and thereby, causes the capacitor 111 to be discharged. For example, the calibration control circuit 304 outputs the pulse to the signal START_CAL and inverts the value of the signal SEL to be supplied to the selectors 306 and 307. For example, the calibration control circuit 304 causes the signal SEL to be "H" from "L" during its calibration time period. Thereby, the selector 307 selects the signal VT and outputs the signal VT to the comparator 121, and the selector 306 selects the signal Disch and outputs the signal Disch to the comparator 121.

The current value control circuit 321 resets the counter 122, and sets the designated value CAL to designate the amount of current generated by the current source circuit 112, to be a predetermined value I1. It is assumed that the predetermined value I1 is determined in advance by the designer.

When the discharging of the capacitor 111 is completed, the current value control circuit 321 causes the signal Disch to be "L" from "H". Thereby, the capacitor 111 is charged by the current that is generated by the current source circuit 112. The comparator 121 determines whether the electric potential difference generated by the capacitor 111 exceeds the threshold value VT. The counter 122 causes the signal Disch to be "L" from "H" and starts counting. For example, the current value control circuit 321 causes the signal Disch to be "L" from "H" and discontinues the input of the reset signal into the counter 122. Thereby, the counter 122 starts counting.

When the electric potential difference of the capacitor 111 exceeds the threshold value VT, the comparator 121 changes the signal COMP from "L" to "H" The counter 122 stops counting when the signal COMP input thereinto from the comparator 121 changes from "L" to "H", and outputs the counted time period T0 to the calculating unit 118.

The calculating unit 118 calculates based on the time period T0 and the predetermined value I0, the designated value I1 such that the measured time period is a predetermined time period T1. As expressed in Eq. (1) below, the designated value I1 calculated by the calculating unit 118 is a value that is acquired by dividing the time period T0 by the predetermined time period T1 and multiplying the division result by the predetermined value I0. The predetermined time period T1 is determined based on the preliminarily determined amount of current to be added. The calculating unit 118 may execute the calculation in any order concerning the Eq. (1) below.

$$I1 = T0/T1 \times I0 \quad (1)$$

As depicted in the lower portion of FIG. 11, when the counted time period T0 is shorter than the predetermined time period T1, the designated value I1 is calculated that causes the amount of the slope current to be decreased. When the counted time period T0 longer than the predetermined time period T1, the designated value I1 is calculated that causes the amount of the slope current to be increased.

The current value control circuit 321 sets the designated value I1 that is calculated by the calculating unit 118 in the current source circuit 112, and outputs the pulse onto a signal END_CAL that indicates that the calibration comes to an end. When the calibration control circuit 304 receives the signal END_CAL, the calibration control circuit 304 causes the signal SEL to be "L" from "H". Thereby, the selector 306 selects the output from the counter 331 and outputs the selected output to the switch 113, and the selector 307 selects the signal COMP_V that indicates the current control value and outputs the selected signal to the comparator 121.

Thus, the slope current added to the output current is constant even when variation occurs in the manufacturing or in the voltage or the temperature.

Figure 12:
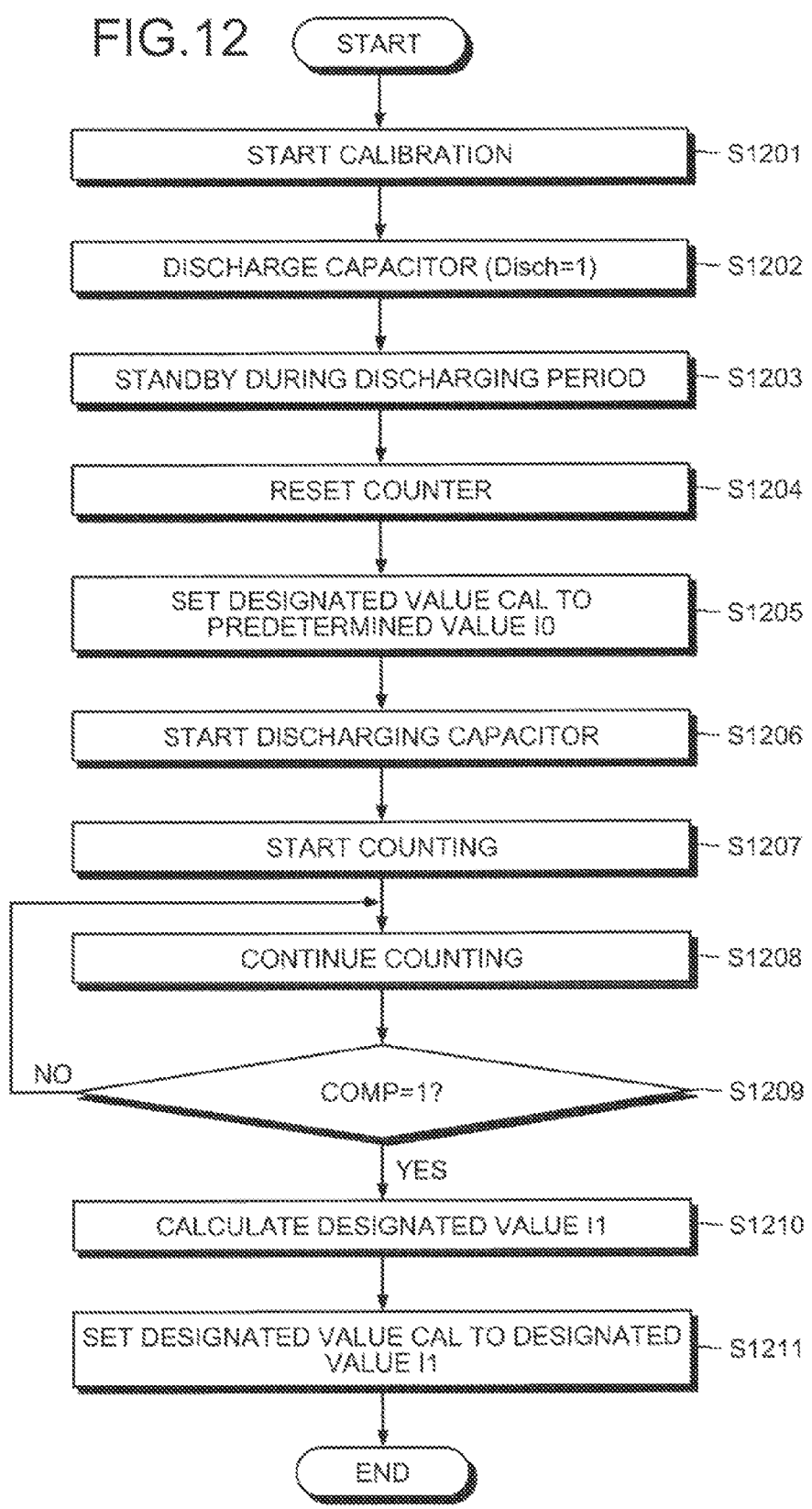
FIG. 12 is a flowchart of an example of a procedure for an adjustment process executed by the adjusting apparatus according to the first embodiment.

FIG. 12 is a flowchart of an example of a procedure for an adjustment process executed by the adjusting apparatus according to the first embodiment. When the adjusting apparatus 100 starts the calibration (step S1201), the adjusting apparatus 100 sets the signal Disch to be "H" and thereby, causes the capacitor 111 to be discharged (step S1202). The adjusting apparatus 100 stands by during the discharging period (step S1203), resets the counter 122 (step S1204), and sets the designated value CAL to be the predetermined value I0 that is an initial value (step S1205).

When the discharging of the capacitor 111 is completed, the adjusting apparatus 100 starts the charging of the capacitor 111 (step S1206), causes the counter 122 to start counting (step S1207), and causes the counting of the clock by the counter 122 to continue (step S1208). The adjusting apparatus determines whether COMP is COMP=1 (step S1209). If the adjusting apparatus 100 determines that COMP is not COMP=1 (step S1209: NO), the procedure returns to step S1208.

On the other hand, if the adjusting apparatus 100 determines that COMP is COMP=1 (step S1209: YES), the adjusting apparatus 100 calculates based on the time period T0 counted by the counter 122 and the predetermined value I0, the designated value I1 with which the measured time period is the predetermined time period (step S1210). The adjusting apparatus 100 sets the designated value CAL to be the designated value I1 (step S1211) and causes the series of process steps to come to an end.

In the second embodiment, an example will be described where a designated value is set with which the time period from the time when the switch is switched to the charging side, until the time when the electric potential difference of the capacitor exceeds the threshold value is a predetermined time period. In the second embodiment, components identical to those of the first embodiment will be given the same reference numerals used in the first embodiment and will not again be described.

Figure 13:
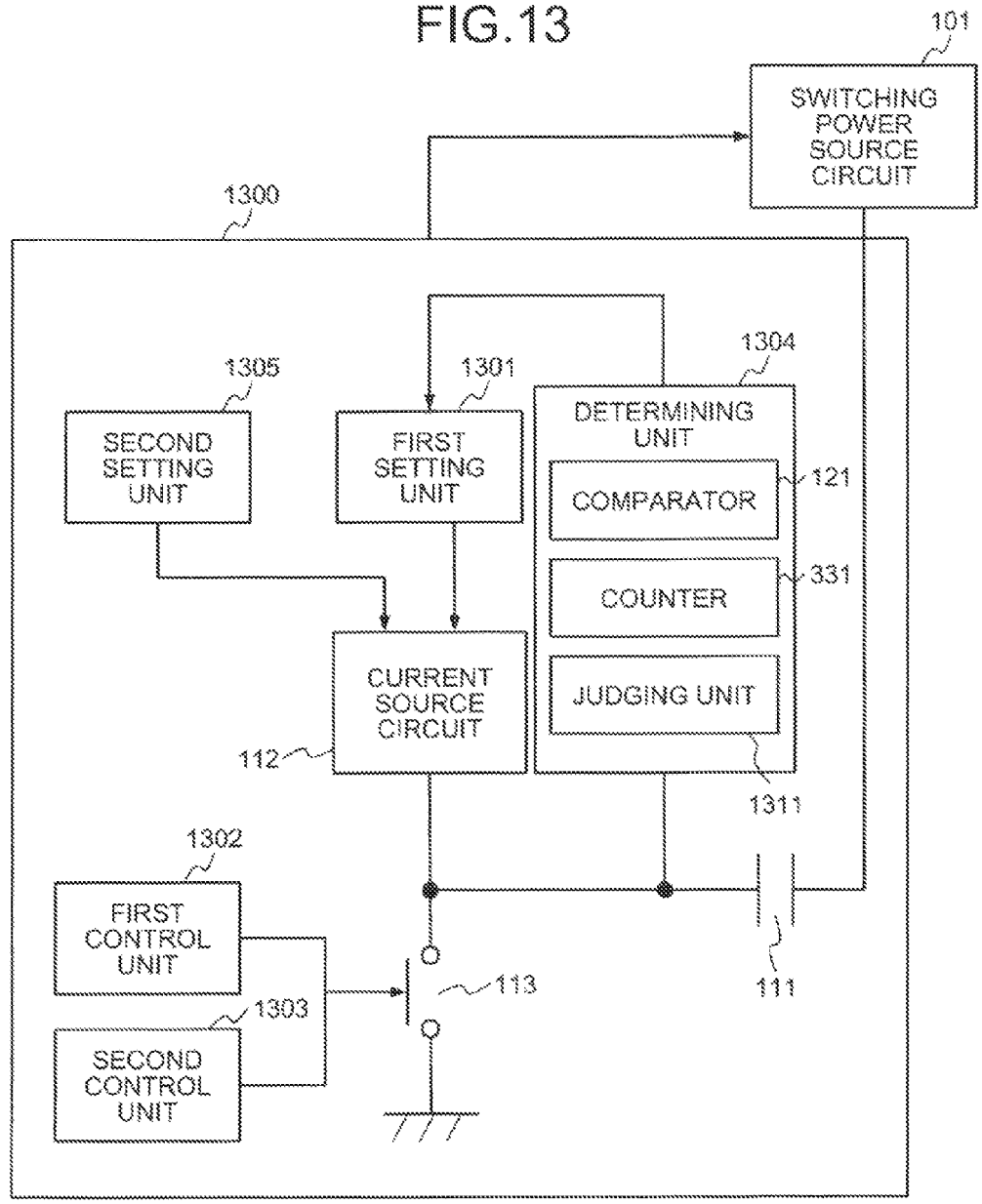
FIG. 13 is an explanatory diagram of the adjusting apparatus according to the second embodiment.

FIG. 13 is an explanatory diagram of the adjusting apparatus according to the second embodiment. The adjusting apparatus 1300 includes the capacitor 111, the current source circuit 112, the switch 113, a first setting unit 1301, a first control unit 1302, a second control unit 1303, a determining unit 1304, and a second setting unit 1305.

The first setting unit 1301 sequentially sets the designated value for the current source circuit 112 to be settable values. The first control unit 1302 switches the switch 113 to the discharging side with the output current not flowing in the capacitor 111 each time the first setting unit 1301 sets the designated value and thereby, causes the discharging of the capacitor 111 to end.

When the first control unit 1302 causes the discharging of the capacitor 111 to end, the second control unit 1303 switches the switch 113 to the charging side and thereby, causes the capacitor 111 to be charged.

The determining unit 1304 determines whether the time period from the time when the second control unit 1303 switches the switch 113 to the charging side until the time when the electric potential difference of the capacitor 111 exceeds the threshold value is the predetermined time period. For example, the determining unit 1304 includes the comparator 121, the counter 331, and a judging unit 1311. The comparator 121 determines whether the electric potential difference of the capacitor 111 exceeds the threshold value. The counter 331 counts a time period from the time when the second control unit 1303 switches the switch 113 to the charging side until the time when the predetermined time period elapses. The judging unit 1311 judges based on the result of the determination by the comparator 121 and the result of the counting by the counter 331, whether the timing at which the electric potential difference of the capacitor 111 exceeds the threshold value matches the timing at which the predetermined time period elapses from the time when the switch 113 is switched to the charging side.

The second setting unit 1305 sets the designated value for the current source circuit 112 to be a value with which the determining unit 1304 determines that the time period to exceed the threshold value is the predetermined time period of the values set by the first setting unit 1301.

Figure 14:
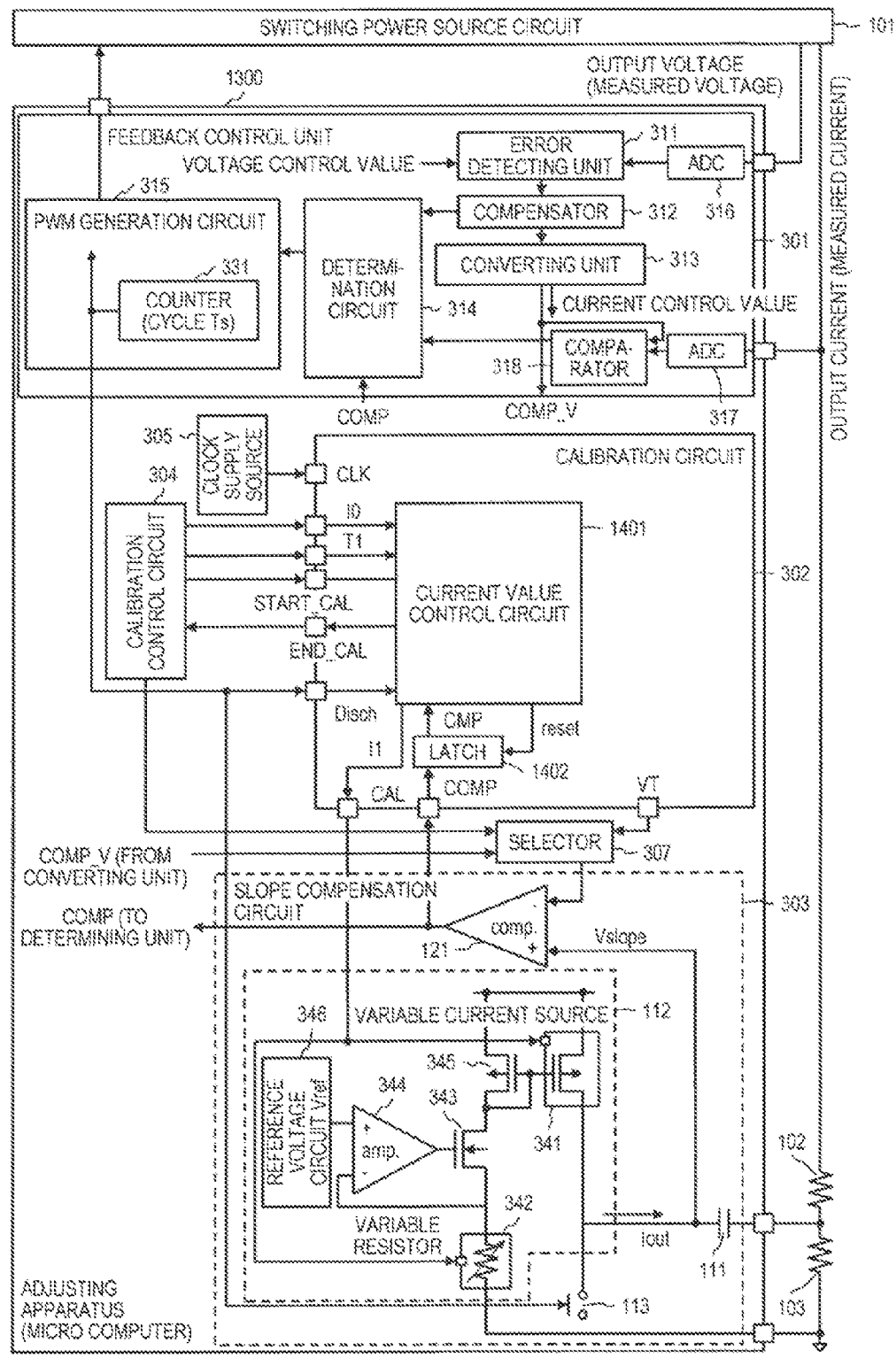
FIG. 14 is an explanatory diagram of a detailed example of the adjusting apparatus according to the second embodiment.

FIG. 14 is an explanatory diagram of a detailed example of the adjusting apparatus according to the second embodiment. The adjusting apparatus 1300 includes the feedback control unit 301, the calibration circuits 302, the slope compensation circuit 303, the selector 307, and a calibration control circuit 304. The calibration circuit 302 includes a current value control circuit 1401 and a latch 1402.

The current value control circuit 1401 includes the first setting unit 1301, the first control unit 1302, the second control unit 1303, the determining unit 1304, the second setting unit 1305, and the judging unit 1311 that are depicted in FIG. 13. The current value control circuit 1401 causes the capacitor 111 to be discharged according to the signal Disch that is the output signal from the counter 331 when the calibration is started; and resets the latch 1402 and causes the charging of the capacitor 111 to start when the discharging is completed.

The current value control circuit 1401 causes the charging of the capacitor 111 to be started such that the time period from the time when the charging of the capacitor 111 is started until the timing at which the signal Disch is changed from "L" to "H", is the predetermined time period T0. Further, the current value control circuit 1401 may reset the latch 1402 such that the time period from the timing at which a signal CMP output from the latch 1402 is changed from "H" to "L" until the timing at which the signal Disch is changed from "L" to "H", is the predetermined time period T0.

When the electric potential difference Vslope of the capacitor 111 exceeds the threshold value VT, the comparator 121 sets the signal COMP to be "H" from "L". The latch 1402 latches the value of the signal COMP using the latch 1402 and inputs the value into the current value control circuit 1401 as the signal CMP.

The current value control circuit 1401 determines whether the timing at which the signal CMP is changed from "L" to "H" matches the timing at which the signal Disch is changed from "L" to "H", further determines whether the two timings match each other for each of the settable set values, and sets the designated value CAL to be the designated value with which the two timings match each other.

Figure 15:
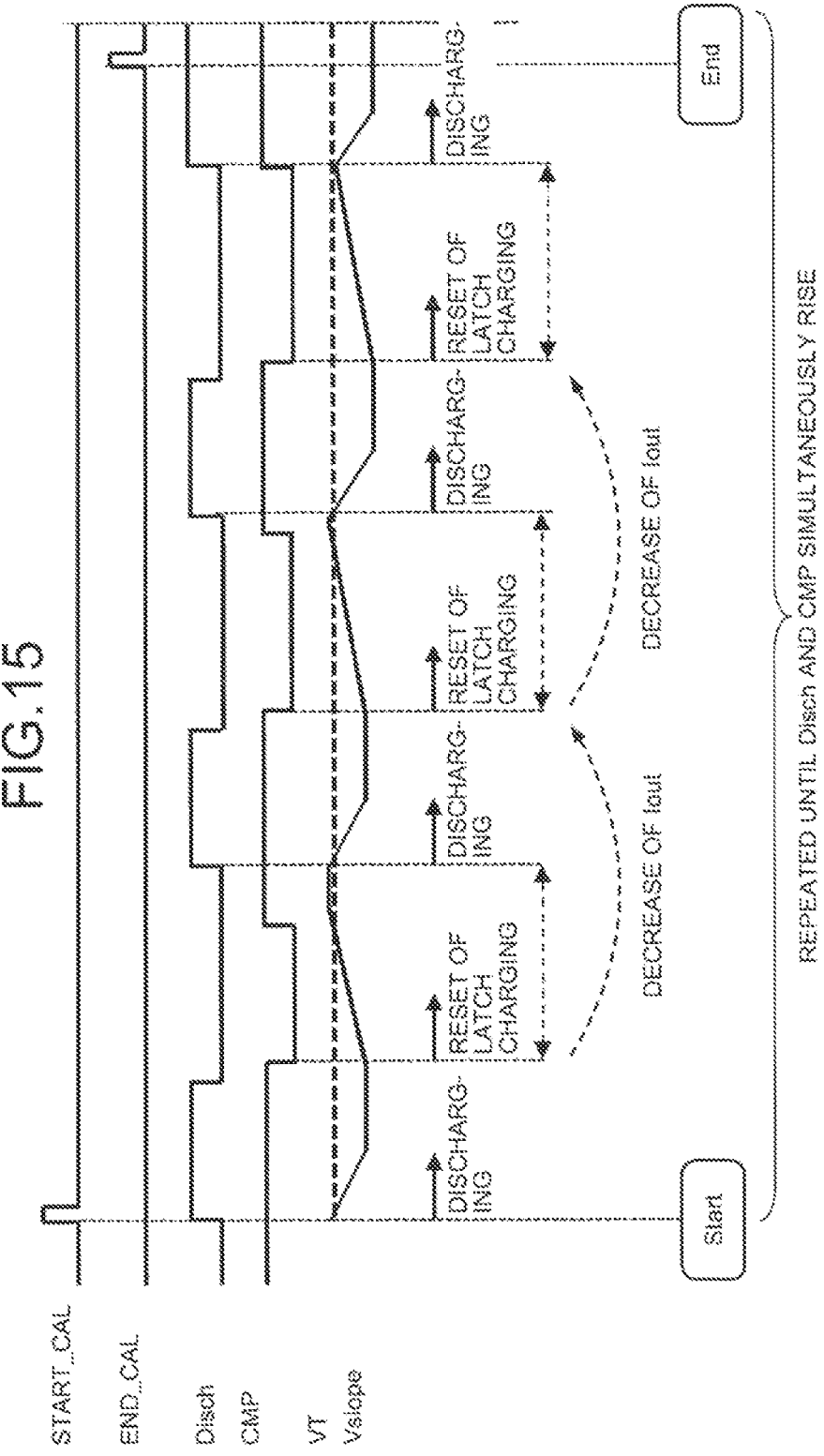
FIG. 15 is an explanatory diagram of an example of setting 1 of a designated value according to the second embodiment.

FIG. 15 is an explanatory diagram of an example of setting 1 of the designated value according to the second embodiment. For example, as depicted in a timing chart thereof, in a case where the amount of current is large, when the designated value CAL is set to be the predetermined value, the signal CMP is changed from "L" to "H" at a timing earlier than that of the signal Disch. As a result, the current value control circuit 1401 sets a subsequent designated value such that the amount of current is smaller than that with the previous designated value.

Figure 16:
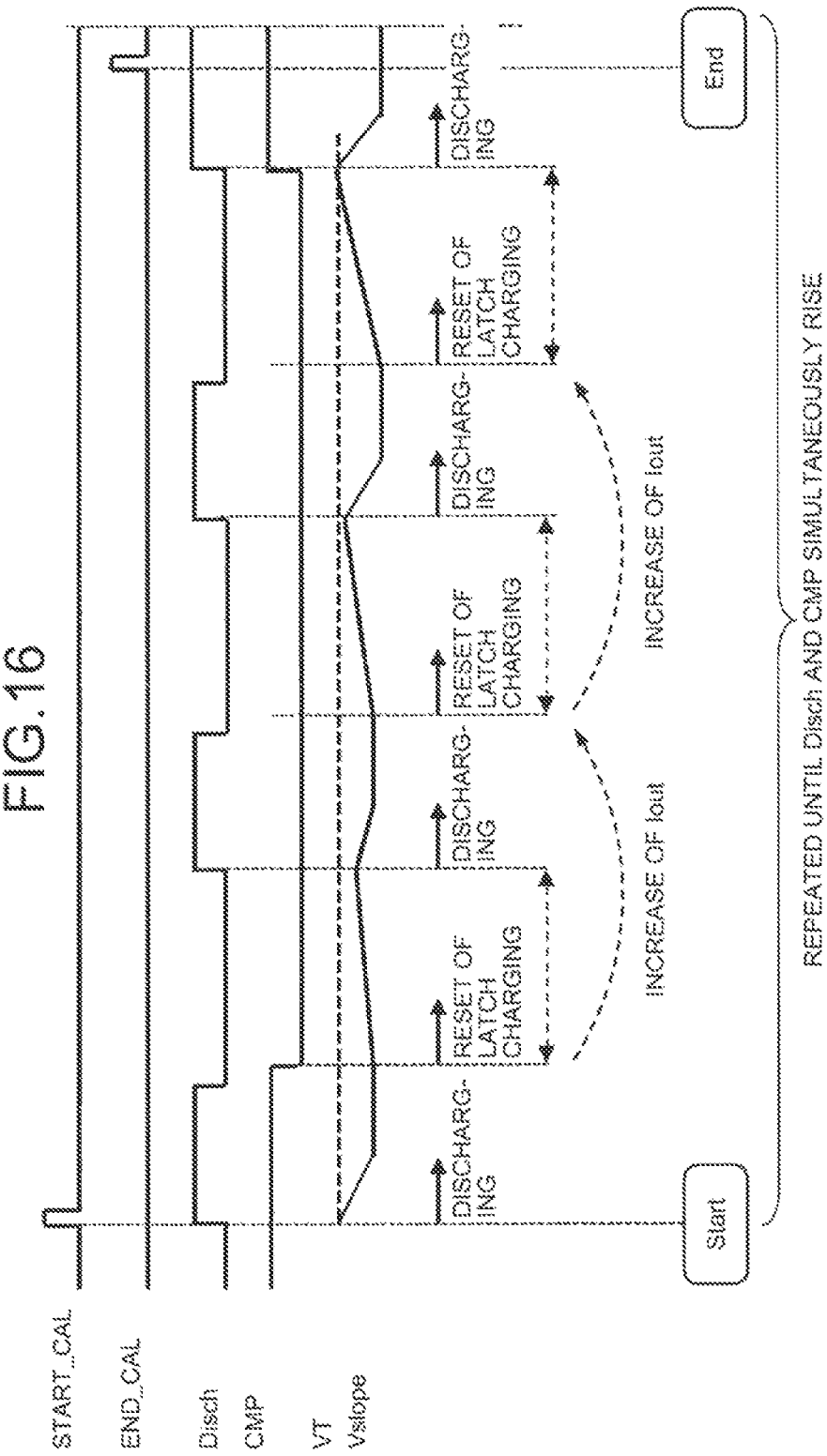
FIG. 16 is an explanatory diagram of an example of setting 2 of the designated value according to the second embodiment.

FIG. 16 is an explanatory diagram of an example of setting 2 of the designated value according to the second embodiment. For example, as depicted in a timing chart thereof, in a case where the amount of current is small, with the designated value CAL that is set to be the predetermined value, even when the signal Disch is changed from "L" to "H", the signal CMP is not changed from "L" to "H". Therefore, the current value control circuit 1401 sets the next designated value such that the amount of current is larger than that with the previous designated value.

FIGS. 17 and 18 are flowcharts of an example of a procedure for the adjusting process executed by the adjusting apparatus to the second embodiment. The adjusting apparatus 1300 starts the calibration (step S1701) and sets the designated value CAL to be the predetermined value I0 (step S1702). The adjusting apparatus 1300 causes the capacitor 111 to be discharged (Disch=1) (step S1703) and stands by during the discharging period (step S1704).

The adjusting apparatus 1300 resets the latch 1402 (step S1705), causes the charging of the capacitor 111 to start (step S1706), and causes the counting to start (step S1707). The adjusting apparatus 1300 stands by during the counting (step S1708) and determines whether a change occurs either of the signals COMP and Disch (step S1709). If the adjusting apparatus 1300 determines that no change occurs in either of the signals COMP and Disch (step S1709: NO), the procedure returns to step S1708.

If the adjusting apparatus determines that a change occurs in the signal COMP or Disch (step S1709: YES), the adjusting apparatus 1300 determines whether the signals COMP and Disch are COMP=1 and Disch=1 (step S1710). If the adjusting apparatus 1300 determines that the signals COMP and Disch are COMP=1 and Disch=1 (step S1710: YES), the adjusting apparatus 1300 sets the designated value CAL to be the current designated value (step S1711) and causes the series of process steps to come to an end.

If the adjusting apparatus 1300 determines that the signals COMP and Disch are not COMP=1 and Disch=1 (step S1710: NO), the adjusting apparatus 1300 determines whether the signal Disch is Disch=0 (step S1801). If the adjusting apparatus 1300 determines that the signal Disch is Disch=0 (step S1801: YES), the adjusting apparatus 1300 stands by during the counting (step S1802), causes the capacitor 111 to be discharged (Disch=1) (step S1803), and determines whether among the designated values that cause the amount of current to be decreased, the designated value that is the closest to the designated value currently set is already set (step S1804).

Thus, the adjusting apparatus 1300 can sequentially set the designated values indicating amounts that are progressively closer to the desired current amount than the previous one.

If the adjusting apparatus 1300 determines that the designated value that is the closest to the designated value currently set is already set (step S1804: YES), the adjusting apparatus 1300 causes the series of process steps to come to an end. If the adjusting apparatus 1300 determines that the designated value that is the closest to the designated value currently set is not yet set (step S1804: NO), the adjusting apparatus 1300 sets among the designated values that cause the amount to be deceased, the designated value to be the designated value that is the closest to the designated value currently set (step S1805) and the procedure returns to step S1705.

If the adjusting apparatus 1300 determines that the signal Disch is not Disch=0 (step S1801: NO), the adjusting apparatus 1300 determines whether among the designated values that cause the amount of current to be increased, the designated value that is the closest to the designated value currently set is already set (step S1806). Thereby, the adjusting apparatus 1300 can sequentially set the designated values indicating amounts that are progressively closer to the desired current amount than the previous one.

If the adjusting apparatus determines that the designated value is already set that is the closest to the designated value currently set (step S1806: YES), the adjusting apparatus 1300 causes the series of process steps to come to an end. If the adjusting apparatus 1300 determines that the designated value is not yet set that is the closest to the designated value currently set (step S1806: NO), the adjusting apparatus 1300 sets among the designated values that cause the amount to be increased, the designated value to be the designated value that is the closest to the designated value currently set (step S1807) and the procedure returns to step S1705.

As described in the first embodiment, the adjusting apparatus 1300 acquires the relation between the designated value of the current to be added and the charging period, by measuring the period of charging the capacitor by the current added to the output current from the switching power source circuit; and sets the designated value for the value of the current to be added, using the acquired relation. Thereby, error in the amount of current added to the output current can be reduced even when variations in the manufacturing is present, and the current added to the output current can be stabilized. Therefore, a desired switching waveform can be supplied to the switching power source circuit and the operation of the switching power source circuit can be stabilized. The error of the added current amount can be reduced according to the environment (the voltage and the temperature) of the user of the switching power source circuit and therefore, the offset of the comparator in the adjusting apparatus can also be corrected.

The designated value to be acquired is a value acquired by dividing the measured charging period by the predetermined time period and multiplying the quotient by the predetermined value. Thereby, the designated value is acquired to be the predetermined time period that corresponds to the desired current amount based on the ratio of the measured charging period to the predetermined value.

The measuring unit of the adjusting apparatus is implemented by the comparator and the counter. For example, the comparator generating the square wave from the output current can be used as the measuring unit and the footprint of the adjusting apparatus can be reduced.

As described in the second embodiment, the adjusting apparatus identifies the designated value with which the time period for the electric potential difference of the capacitor charged by the current added to the output current from the switching power source circuit reaches the threshold value is the predetermined time period, and sets the designated value of the current source circuit to be the identified designated value. Thereby, error in the amount of current added to the output current can be reduced even when variations in the manufacturing is present, and the current added to the output current can be stabilized. Therefore, a desired switching waveform can be supplied to the switching power source circuit and the operation of the switching power source circuit can be stabilized. The error of the added current amount can be reduced according to the environment. (the voltage and the temperature) of the user of the switching power source circuit and therefore, the offset of the comparator in the adjusting apparatus can also be corrected.

The adjusting apparatus according to the second embodiment includes no such computing circuit as that included in the adjusting apparatus according to the first embodiment and therefore, the footprint thereof can be reduced. On the other hand, the adjusting apparatus according to the first embodiment does not set the designated value for plural times and does not repeat the charging and the discharging as the adjusting apparatus according to the second embodiment does, and can acquire in only one computing session, the designated value with which the value of the amount of current to be added is the target value. Therefore, the time period to set the designated value can be reduced.

The determining unit of the adjusting apparatus is implemented by the comparator, the counter, and the judging unit. For example, the comparator generating the square wave voltage from the output current can be used as the measuring unit and therefore, the footprint of the adjusting apparatus can be reduced.

According to an aspect of the present invention, the occurrence of errors can be reduced by an amount equivalent to the current added to the output current supplied from the switching power source circuit.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An adjusting apparatus comprising:
   a capacitor that is charged by output current output from a switching power source circuit;
   a current source circuit that generates a current of an amount corresponding to a set designated value, and causes the capacitor to be charged by the generated current;
   a switch that switches between charging of the capacitor by the current from the current source circuit and discharging of the capacitor;
   a first setting unit that sets the designated value for the current source circuit to be a predetermined value;
   first control unit that causes the discharging of the capacitor to end by switching the switch to a discharging side when the capacitor is not charged by the output current;
   second control unit that causes the capacitor to be charged by switching the switch to a charging side, after the first control unit causes the discharging of the capacitor to end and the first setting unit sets the designated value;

a measuring unit that measures a time period from a time when the second control unit switches the switch to the charging side until a time when an electric potential difference of the capacitor exceeds a threshold value;

a calculating unit that calculates based on the time period measured by the measuring unit and the predetermined value, the designated value such that the time period measured by the measuring unit is a predetermined time period; and a second setting unit that sets the designated value for the current source circuit to be the designated value calculated by the calculating unit.

2. The adjusting apparatus according to claim 1, wherein the calculating unit calculates the designated value by dividing the time period measured by the measuring unit by the predetermined time period and multiplying a resulting quotient by the predetermined value.

3. The adjusting apparatus according to claim 1, wherein the measuring unit comprises:

a comparator that determines whether the electric potential difference of the capacitor exceeds the threshold value; and a counter that counts the time period from the time when the second control unit switches the switch to the charging side until the time when the electric potential difference of the capacitor exceeds the threshold value.

4. An adjusting apparatus comprising:

a capacitor that is charged by output current output from a switching power source circuit;

a current source circuit that generates a current of an amount corresponding to a set designated value and causes the capacitor to be charged by the generated current;

a switch that switches between charging of the capacitor by the current from the current source circuit and discharging of the capacitor;

a first setting unit that sequentially sets the designated value for the current source circuit to be settable values;

a first control unit that each time the first setting unit sets the designated value, causes the discharging of the capacitor to end by switching the switch to a discharging side when the capacitor is not charged by the output current;

a second control unit that causes the capacitor to be charged by switching the switch to a charging side when the first control unit causes the discharging of the capacitor to end;

a determining unit that determines whether a time period from a time when the second control unit switches the switch to the charging side until a time when an electric potential difference of the capacitor exceeds a threshold value is a predetermined time period; and a second setting unit that sets among the designated values set by the first setting unit, the designated value for the current source circuit to be a value for which the determining unit determines that the time period to exceed the threshold value is the predetermined time period.

5. An adjusting apparatus according to claim 4, wherein the determining unit comprises:

a comparator that determines whether the electric potential difference of the capacitor exceeds the threshold value;

a counter that counts a time period from the time when the second control unit switches the switch to the charging side until a time when the predetermined time period elapses; and a judging unit that judges based on a result obtained by the comparator and a result of the counting by the counter, whether a timing at which the electric potential difference of the capacitor exceeds the threshold value matches the timing at which the predetermined time period elapses from the time when the second control unit switches the switch to the charging side.

6. An adjusting method of adjusting a designated value that sets a slope compensation circuit having a capacitor that is charged by output current output from a switching power source circuit; a current source circuit that generates a current of an amount corresponding to the set designated value, and causes the capacitor to be charged by the generated current; and a switch that switches between charging of the capacitor by the current from the current source circuit and discharging of the capacitor, the adjusting method comprising:

setting the designated value for the current source circuit to be a predetermined value;

causing the discharging of the capacitor to end by switching the switch to a discharging side when the capacitor is not charged by the output current;

causing the capacitor to be charged by switching the switch to a charging side, after the discharging of the capacitor ends and the designated value is set;

measuring a time period from a time when the second control unit switches the switch to the charging side until a time when an electric potential difference of the capacitor exceeds a threshold value;

calculating based on the measured time period and the predetermined value, the designated value such that the time period measured at the measuring is a predetermined time period; and setting the designated value for the current source circuit to be the designated value calculated at the calculating unit.

* * * * *